L. A. CARPENTER & R. MIDDLETON.
PIPE HANGER.
APPLICATION FILED FEB. 24, 1912.

1,025,243.

Patented May 7, 1912.

Witnesses
Edward G. Allen.
J. Murphy

Inventors
Lewis A. Carpenter
Richard Middleton
by Jas. H. Churchill
Atty.

UNITED STATES PATENT OFFICE.

LEWIS A. CARPENTER AND RICHARD MIDDLETON, OF REVERE, MASSACHUSETTS.

PIPE-HANGER.

1,025,243.  Specification of Letters Patent.  Patented May 7, 1912.

Application filed February 24, 1912. Serial No. 679,594.

*To all whom it may concern:*

Be it known that we, LEWIS A. CARPENTER and RICHARD MIDDLETON, citizens of the United States, and both residing in Revere, county of Suffolk, and State of Massachusetts, have invented an Improvement in Pipe-Hangers, of which the following description, in connection with the accompanying drawings, is a specification, like letters on the drawings representing like parts.

This invention relates to a pipe hanger and has for its object to provide a pipe hanger which is made from a combination of elements of sheet metal and solid or cast metal, whereby a superior, attractive and less expensive device may be produced, which is capable of being readily shortened, whereby the hangers may be made of standard length and then shortened when required, as will be described.

The particular features of the invention will be pointed out in the claims at the end of this specification.

Figure 1:
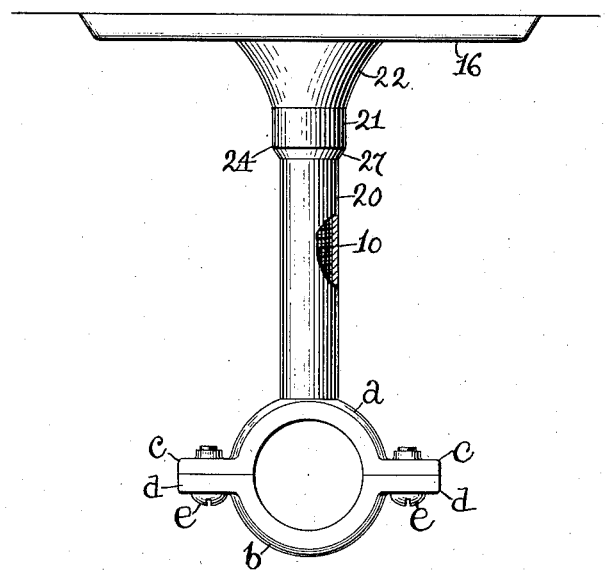
Figure 2:
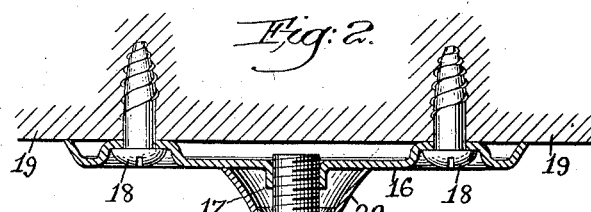
Figure 3:
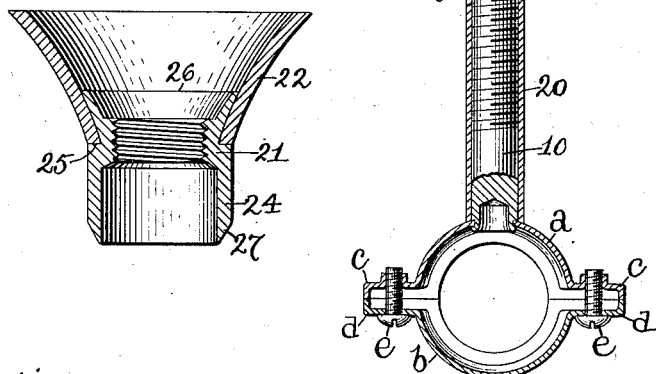
Figure 4:
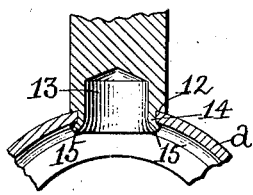

Figure 1 is an elevation of a pipe hanger embodying this invention. Fig. 2, a vertical section of the hanger shown in Fig. 1, and Figs. 3 and 4, enlarged sectional details to be referred to.

Referring to the drawing, *a*, *b*, represents two coöperating pipe-engaging members, which are made of sheet metal, such as sheet brass, and are provided with ears *c*, *d*, which carry clamping screws *e*. The pipe-engaging member *a* is firmly secured to a thread rod 10, and for this purpose the said rod is reduced in diameter at one end to form a shoulder 12 (see Fig. 4), and is provided with a socket 13 so as to form a hollow reduced portion or extension 14, which is extended through a hole in the member *a* from the outer to the inner side thereof, and has its free end expanded to form a clamping flange or lip 15, which serves to firmly clamp the member *a* against the shoulder 12 and thereby firmly secure said member on said rod.

The threaded rod 10 is detachably secured to a sheet metal base plate 16, which is provided with a central nipple 17, struck up from the plate and provided on its interior with screw-threads, which are engaged by the threaded rod 10. The base plate 16 is provided with suitable holes for the passage of screws 18, by which the hanger is secured to a wall or other support 19. The threaded rod 10 has mounted on it between the base plate 16 and the member *a*, a tube or sleeve 20, which is loose on the said rod, a nut 21, which is in threaded engagement with said rod, and a sheet metal bell 22, which is fastened to said nut. The nut 21 is provided at one end with a cylindrical extension 24 (see Fig. 3) of larger internal diameter, which forms a socket for the reception of the lower end of the tube or sleeve 20, and the other end of the nut is reduced in diameter on its exterior to form a shoulder 25 and is enlarged in diameter on its interior to form an extension 26, which is beveled or tapered on its exterior and is expanded to engage the inner surface of a bell 22, which is made of sheet metal and is firmly secured to the nut 21 by the expanded extension 26 of the nut and the external shoulder 25. The bell 22 is designed to have its wider mouth bear against the base plate 16, and it is held in firm engagement therewith by the threaded rod 10 engaging the threaded opening or nipple 17 on the sheet metal base plate. The cylindrical extension 24 on the nut 21 may and preferably will be provided with a beveled end 27 to make an attractive joint between the tube 20 and said nut. Furthermore the joint between the nut and bell adds to the attractiveness and salability of the hanger.

From the above description, it will be seen that the base plate 16, bell 22, tube 20 and pipe-engaging members *a*, *b*, are made of thin stock, such as sheet metal and that only the rod 10 and nut 21 are made of solid stock or heavy metal, consequently the hanger is light and inexpensive.

The threaded rod 10 and sleeve 20 may be made of a length which serves as a standard, and if the hanger is used with a pipe, which is located nearer to the wall or support 19, the standard hanger can be readily adjusted to this condition, for it only requires that the threaded rod 10 and sleeve 20 be cut off to enable the hanger to be used with the pipe (not shown).

Claims.

1. In a pipe hanger, in combination, sheet-metal pipe-engaging members, a threaded rod secured to one of said members, a sheet metal base plate having a threaded nipple with which the free end of said rod engages, a sleeve loose on said threaded rod, a nut on said threaded rod having at one end a cylindrical extension for the reception of one end of said sleeve, and having at its other end a clamping extension and an external shoulder, and a sheet metal bell abutting against said shoulder and secured to said nut by said clamping extension, substantially as described.

2. In a pipe hanger, in combination, pipe-engaging members, a threaded rod secured to one of said members, a base plate provided with a threaded opening with which the free end of said rod engages, a sleeve loose on said threaded rod, a nut on said threaded rod having at one end a cylindrical extension for the reception of one end of said sleeve and having at its other end a clamping extension and an external shoulder, and a sheet metal bell abutting against said shoulder and secured to said nut by said clamping extension, substantially as described.

3. In a pipe hanger, in combination, a sheet-metal pipe-engaging member having a hole extended through it, a threaded solid rod having a reduced end portion forming a shoulder and provided with a socket which forms a hollow extension of the solid rod which is inserted through the hole in said pipe-engaging member and expanded therein, a sheet metal base plate having a threaded opening for engagement with said rod, a nut engaging said threaded rod, a sleeve interposed between said nut and pipe engaging member, and a sheet metal bell secured to said nut and engaging said base plate, substantially as described.

4. In a pipe hanger, in combination, sheet-metal pipe-engaging members, a threaded solid rod secured to one of said members, a sheet metal base plate having a threaded opening with which the threaded rod is engaged, a nut on said rod, a sleeve on said rod interposed between said nut and pipe-engaging members, and a metal bell interposed between said nut and said base plate and bearing against the latter, substantially as described.

In testimony whereof, we have signed our names to this specification in the presence of two subscribing witnesses.

LEWIS A. CARPENTER.
RICHARD MIDDLETON.

Witnesses:
JAS. H. CHURCHILL,
J. MURPHY.